(12) United States Patent
O'Donnell et al.

(10) Patent No.: US 12,486,045 B2
(45) Date of Patent: Dec. 2, 2025

(54) F-35 DUAL SIDE AIR DATA PORT COVER

(71) Applicant: Government of the United States, as represented by the Secretary of the Air Force, Wright-Patterson AFB, OH (US)

(72) Inventors: Christopher O'Donnell, Hill AFB, UT (US); Justin Platt, Roy, UT (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 345 days.

(21) Appl. No.: 18/176,758

(22) Filed: Mar. 1, 2023

(65) Prior Publication Data

US 2024/0294270 A1    Sep. 5, 2024

(51) Int. Cl.
  *B64F 1/00*    (2024.01)

(52) U.S. Cl.
  CPC ................... *B64F 1/005* (2013.01)

(58) Field of Classification Search
  CPC ............. B60P 11/06; B60P 3/226; B64F 1/14
  See application file for complete search history.

(56) References Cited

U.S. PATENT DOCUMENTS

| | | | |
|---|---|---|---|
| 4,586,729 A | 5/1986 | Beylerian | |
| 4,802,523 A * | 2/1989 | Scholten | A47H 23/02 |
| | | | 160/354 |
| 4,849,272 A | 7/1989 | Haney | |
| 4,884,824 A | 12/1989 | Radke | |
| 5,115,848 A | 5/1992 | Malone | |
| 5,158,486 A * | 10/1992 | Tamame | F24F 13/20 |
| | | | 62/506 |
| 5,291,845 A * | 3/1994 | Vallery | B63B 19/14 |
| | | | 114/201 R |
| 5,799,975 A | 9/1998 | Crick | |
| 6,843,681 B2 * | 1/2005 | Sanner | H01R 27/02 |
| | | | 297/217.3 |
| 6,865,850 B1 * | 3/2005 | Campbell | E04G 21/30 |
| | | | 160/369 |
| D512,365 S * | 12/2005 | Bladt | D12/345 |
| 8,354,909 B2 | 1/2013 | Fullerton et al. | |
| 8,365,799 B2 | 2/2013 | Harris | |

(Continued)

OTHER PUBLICATIONS

Leavitt Communications "Kennon Announces Portable Magnetic Aircraft Covers for Military Fighter Jets" <https://leavcom.com/2022n/kennon_n081622.php> (Year: 2022).*

(Continued)

*Primary Examiner* — Johnnie A. Shablack
(74) *Attorney, Agent, or Firm* — AFMCLO/JAZ; Larry L. Huston

(57) ABSTRACT

A cover for the data ports disposed on opposite sides of a F-35 aircraft. The cover is macroscopically planar when not in use but flexible to conform to the curves on the sides of the F-35 airframe when the cover is attached. The cover is magnetically attached to three sides of a frame circumscribing air data port, but not attached on the forward side of the frame. This geometry provides for a covers which are symmetric and therefore usable with air data ports on both sides of the F-35 aircraft. The air data port cover does not have mechanical attachments or parts separable in use.

8 Claims, 6 Drawing Sheets

(56) References Cited

U.S. PATENT DOCUMENTS

| | | | |
|---|---|---|---|
| 8,540,792 B2 | 9/2013 | Crook | |
| 8,779,877 B2 | 7/2014 | Fullerton et al. | |
| 8,857,887 B1* | 10/2014 | Schmeichel | B60P 7/04 |
| | | | 296/100.18 |
| 9,630,699 B2* | 4/2017 | Combs | B64C 1/14 |
| 9,656,512 B1 | 5/2017 | Ellis | |
| 9,945,173 B2* | 4/2018 | Boyer, Jr. | E06B 3/308 |
| 10,086,952 B2* | 10/2018 | Jha | F21V 31/005 |
| 10,259,303 B2 | 4/2019 | Kalenski | |
| 11,772,812 B1 | 10/2023 | Caban, II | |
| 12,054,238 B2* | 8/2024 | Thompson | B64C 1/1446 |
| 2001/0008702 A1 | 7/2001 | Vela | |
| 2007/0015607 A1 | 1/2007 | Hot | |
| 2014/0060760 A1 | 3/2014 | Harris | |
| 2014/0182795 A1* | 7/2014 | Singleton | B60J 11/08 |
| | | | 160/370.21 |
| 2015/0075736 A1* | 3/2015 | Gong | B60J 1/2011 |
| | | | 160/370.21 |
| 2015/0082708 A1* | 3/2015 | Eilken | B64C 1/14 |
| | | | 49/477.1 |
| 2015/0300078 A1* | 10/2015 | Porter, IV | G09F 7/00 |
| | | | 160/368.1 |
| 2015/0328967 A1* | 11/2015 | Yang | B60J 11/08 |
| | | | 160/370.21 |
| 2017/0174310 A1* | 6/2017 | Klettke | B64C 1/1484 |
| 2020/0040568 A1 | 2/2020 | Gebhardt et al. | |
| 2023/0399125 A1* | 12/2023 | Caban, II | B64D 45/00 |
| 2024/0391603 A1* | 11/2024 | Edwards | B64D 37/08 |

OTHER PUBLICATIONS

Kennon "Kennon F-35 Flush Port Module Cover" <https://www.kennonproducts.com/pmac-pdf-download/> (Year: 2022).*

Home Depot, "Magnetic Grill Cover", available from Home Depot before the filing date; Webpage dated Mar. 20, 2023; https://www.homedepot.com/p/Frost-King-15-in-x-8-in-Magnetic-Grille-Covers-MC815/100345609.

Home Depot, "Magnetic Register/Vent Cover", available from Home Depot before the filing date; Webpage dated Mar. 20, 2023; https://www.homedepot.com/p/Elima-Draft-4-in-1-Insulated-Magnetic-Register-Vent-Cover-in-White-ELMDFT4X1A3402/205626632#overlay.

https://trisoftcovers.com Website for aircraft covers. Last visited Jan. 25, 2024.

* cited by examiner

F-35 DUAL SIDE AIR DATA PORT COVER

STATEMENT OF GOVERNMENT INTEREST

The invention described and claimed herein may be manufactured, licensed and used by and for the Government of the United States of America for all government purposes without the payment of any royalty.

FIELD OF THE INVENTION

The present invention is related to an air data port cover for a F-35 air frame and more particularly to a matched pair of identical air data port covers which can be interchangeably used on both sides of the F-35 aircraft.

BACKGROUND OF THE INVENTION

The Lockheed Martin F-35 is a single seat stealth-capable aircraft capable of carrying an ordinance payload greater than 8100 kg at supersonic speeds. The F-35 is said to be the most advanced aircraft in the world and expected to replace a host of other fighter aircraft, both domestically and internationally. Production of the F-35 airframe began Nov. 10, 2003 with the first flight completed Dec. 15, 2006. The F-35 airframe is executed in three platforms: the F-35A Lightening II designed for conventional runways and the most common platform; the F-35B Lightening II with vertical landing and short-field takeoff capability and the F-35C Lightening II built for aircraft carrier operations.

Nine countries were involved with the development of the F-35 airframe. More than 1500 companies and 250000 jobs are involved in the supply chain and production of the F-35 airframe.

Despite all of these advanced capabilities, numerous development partners, years of production and thousands of hours of flight time, problems remain. Particularly the twin symmetrically opposed air data flush ports need to be covered and protected while the F-35 on ground. The air data ports are forward of and below the canopy, adjacent the nose cone. The air data ports are curved in two planes-converging towards the nose and arcuate around the longitudinal axis of the aircraft. Each air data port receives dynamic, real time information during flight which is used for navigation and control.

The air data ports are oval shaped, having a major axis generally parallel to the longitudinal axis of the F-35 aircraft. Circumscribing the oval shaped air data port is an irregular five sided flush port panel, as shown below. The front edge of the flush port panel is a short generally vertical side. The aft edge of the flush port panel is pointed. The top and bottom of the flush port panel are mutually parallel with the bottom being more than twice the length of the top. Circumscribing and substantially congruent with the flush port panel is a metallic frame. Outside of the metallic frame is a delicate low observable coating. Complicating the geometry are the intake holes in the data port. The seven intake holes of the air data port are closely spaced and offset from the center of the flush port panel, in the aft direction, requiring this offset to be accounted for on both sides of the F-35 aircraft.

If dirt, water, animals and other debris intrude into the data port when the F-35 is grounded, damage to delicate instrumentation or erroneous readings during combat flights may result. To protect the air data ports, each air data port has a cover which is attached when the F-35 is on the ground.

The challenge is exacerbated by the skin of the F-35 airframe. A major portion of the aircraft has a delicate, non-magnetic low observable coating. The flush port panel Is nonmagnetic beryllium. Other portions of the skin are magnetic, as are hardware behind the aft edge of this flush port panel.

Furthermore, the air data port cover assembly comprises multiple parts made of various materials. For example, the current data port covers according to the prior art are temporarily attached to the surface of the aircraft by a complex multi-part assembly having a bridge spanning two metal pins and having at least 10 separate parts. If any part is lost, the multi-part assembly may be unusable. If the part is lost near a runway several manhours of foreign object detection and walking the runway is necessary. Even if all goes well none of the parts is lost, the pins must be inserted into a pair of complementary holes in the skin of the aircraft. A platen is screwed down from the bridge to hold yet a separate port cover shield in place. But these pins are easily bent in use, scratching of the delicate low observable skin coating by the metal pins occurs and parts become separated and lost. Furthermore, an O-ring is also needed to seal the prior art cover to the port, but is prone to simply becoming dislodged and lost. And furthermore, these cover assemblies have a replacement of more than $600 each. Clearly a better approach is needed.

Accordingly, it is an object of this invention to provide an integral air data port cover which solves the problem of being removably attachable to the skin of an aircraft without damaging delicate coatings, which can be interchangeably used on either side of the aircraft with a curvilinear surface and which does not require manipulation of pins, screws or other fittings which could damage the skin of the aircraft for attachment and is integral.

SUMMARY OF THE INVENTION

In one embodiment the invention comprises an air data port cover in combination with an F-35 aircraft and being removably attached thereto. The combination comprises a first air data port disposed in a side of the F-35 aircraft and being circumscribed by a five-sided magnetic frame, an air data port cover having a shield and a plurality of magnets permanently joined thereto, the air data port cover being macroscopically planar with an outwardly facing front side and a back side opposed thereto and having plural sides overlapping the frame and at least one side spanning and within the frame wherein the at least one side is not magnetically attached to the frame and the air data port cover is removably magnetically attached to the F-35 aircraft to thereby cover the first air data port. In another embodiment the invention comprises a kit of two such mutually identical air data port covers. In yet another embodiment the invention comprises a method of covering two air data ports disposed on opposed sides of a F-35 aircraft, each air data port being circumscribed by a respective magnetic frame which is curved in two planes. The method comprising the steps of providing a pair of macroscopically planar flexible air data port covers configured to fit a respective magnetic frame and having a first plurality of perimetrically spaced apart magnets, magnetically attaching each flexible air data port cover to a respective magnetic frame, wherein the flexible air data port cover is curved to conform to the two planes of the magnetic frame, without the use of mechanical attachments and without having a macroscopically planar flexible air data port cover specified for a specified air data port.

BRIEF DESCRIPTION OF THE DRAWINGS

FIGS. 1, 2, 4, 5, 6 and 7 are drawn to scale.

DETAILED DESCRIPTION OF THE INVENTION

Figure 1:
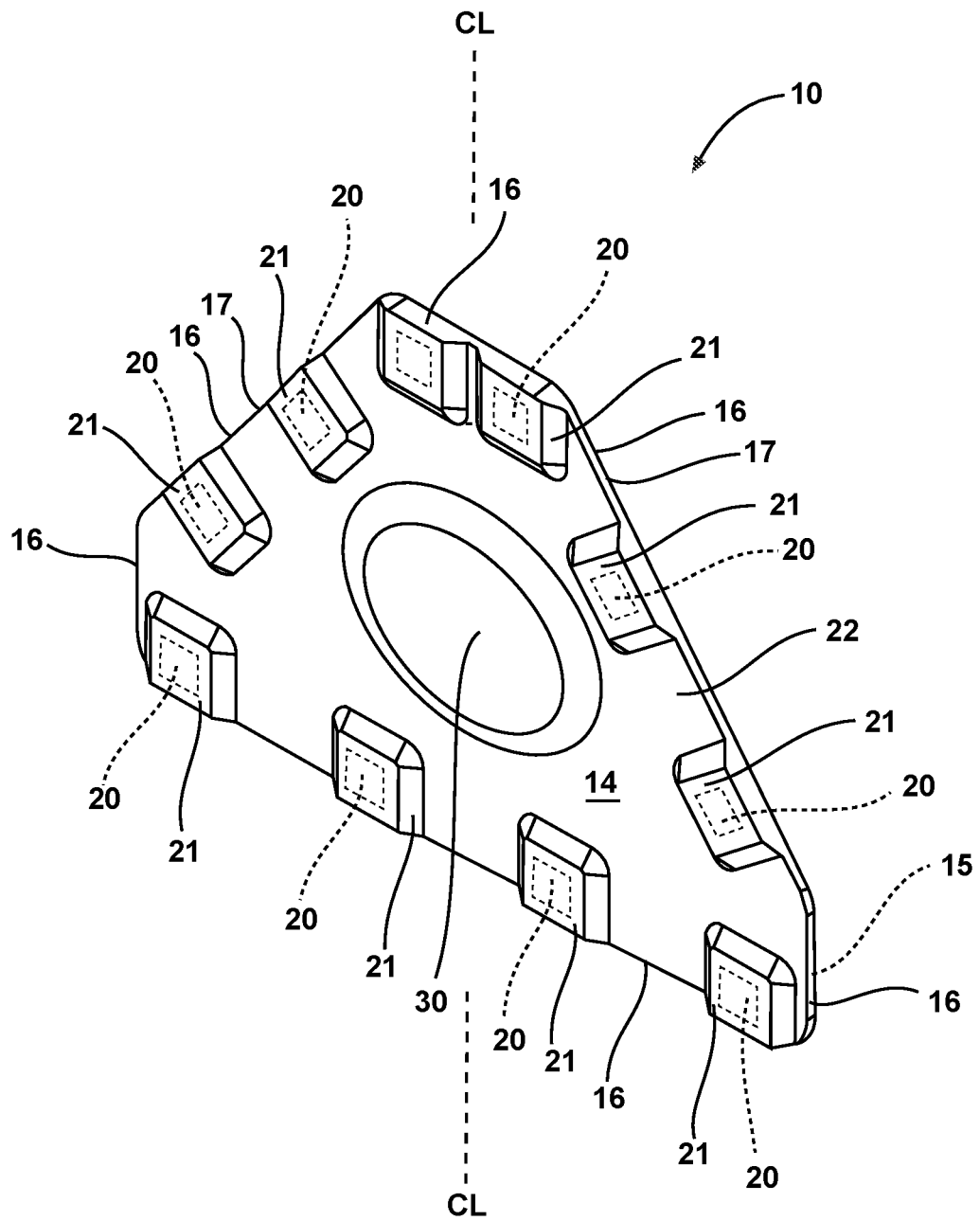
FIG. 1 is a perspective view of an air data port cover according to the present invention having square magnets shown in phantom.
Figure 2:
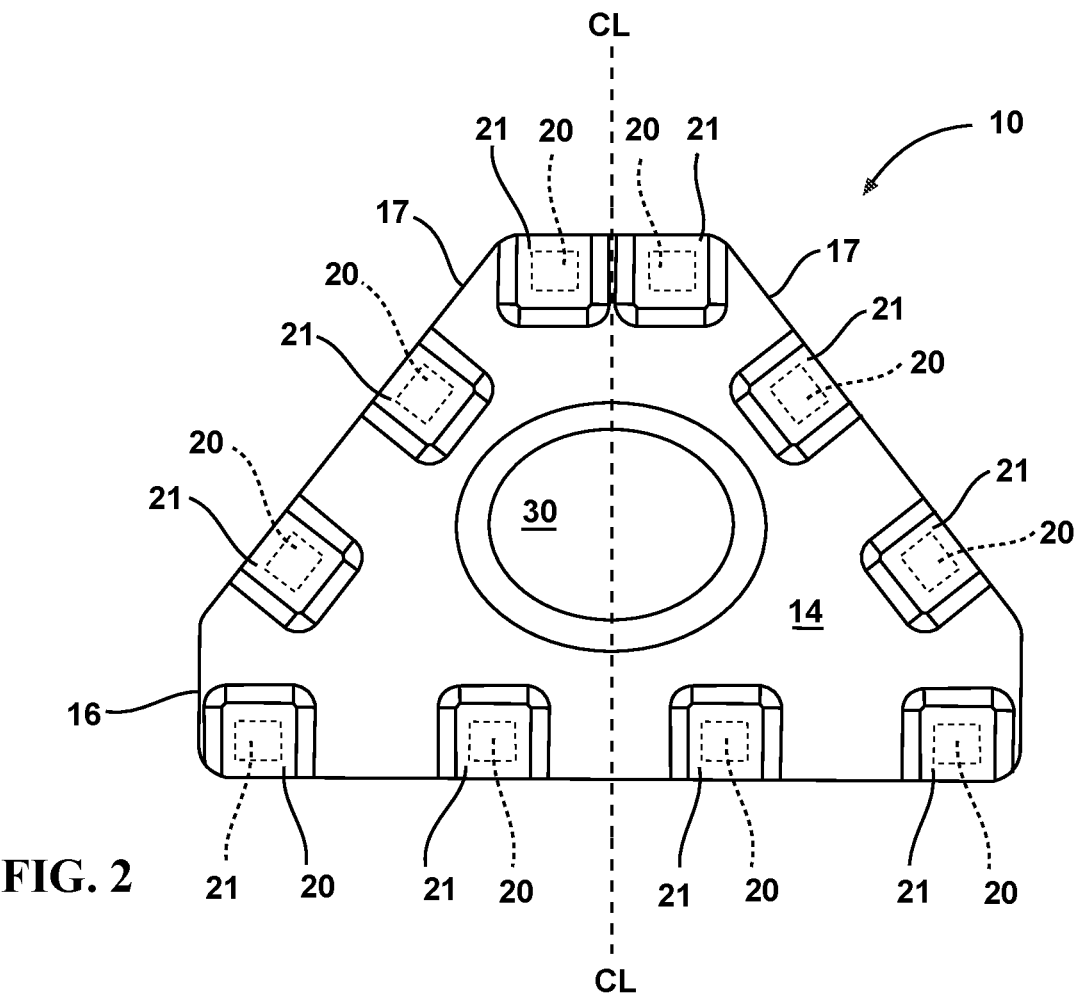
FIG. 2 is a front elevational view of the air data port of FIG. 1.

Referring to FIG. 1 and FIG. 2 the integral F-35 air data port cover 10 of the present invention comprises a flexible panel which is macroscopically planar in an unconstrained state. The integral, one-piece cover 10 has three components: a preferably monolithic shield 22, an O-ring 31 configured to circumscribe the seven air data ports and a plurality of magnets 20 suitable for releasable attachment to the magnetic portion of a frame 42 proximate the data port 40. By releasably attachable it is meant that the cover 10 is not attached by adhesive, threaded fasteners, quick release pins, clips, latches or clamps [collectively referred to herein as mechanical attachments] and can be installed on and removed from the F-35 aircraft without tools.

The cover 10 may have six sides as shown, although other polygonal and curvilinear shapes are contemplated. More particularly, the cover 10 may be frustro-isosceles triangular, as shown. The cover 10 is generally flexible, to conform to the curvilinear surface. By flexible it is meant that the cover 10 can elastically conform to the curved surface in both aforementioned planes when attached to the F-35 airframe and autonomously return to a generally flat configuration upon removal. The cover 10 is preferably symmetric about a vertical centerline CL.

The F-35 air data port cover 10 has a front side 14 and a back side 15 opposed thereto. The front side 14 of the cover 10 faces outwardly and away from the F-35 aircraft and is visible when the cover 10 is in use. The opposed back side 15 of the cover 10 faces inwardly towards the data port 40 and is not visible when the cover 10 is in use. By 'in use' it is meant the cover 10 is deployed on one side or the other of the aircraft and disposed in place to protect the air data port 40. The front side 14 of the cover 10 may have a plurality of pods 21 extending outwardly from the plane of the cover 10 to provide extra thickness for the pods 21 as described herein. The front of the cover 10 also has a central projection 30 to hold an O-ring 31 therein.

The periphery of the cover 10 has a plurality of peripheral magnets 20 juxtaposed with the perimeter 16. The magnets 20 are preferably permanently embedded within the shield 22 of the cover 10. Particularly, the magnets 20 are embedded in pods 21 proximate the perimeter 16 of the cover 10. The pods 21 may be thicker than the balance of the shield 22, to fully and permanently encase the peripheral magnets 20 while conserving material elsewhere.

The shield 22 of the cover 10 made be made by 3D printing/additive manufacturing as is known in the art or by casting. If 3D printing/additive manufacturing is selected for the shield 22, the layers are preferably added in the horizontal plane, starting with the back side 15 of the cover 10. The shield 22 is printed until approximately a halfway thickness is or less reached. Contrary to conventional wisdom, the 3D printing/additive manufacturing is paused based upon thickness or number of layers/passes.

The pause yields a shield 22 which is substantially printed, except for the pods 21 which have only approximately one-half thickness. Upon pausing, the magnets 20 are manually emplaced upon the nascent pods 21. Printing/additive manufacturing is resumed and the magnets 20 are fully encased in the respective pods 21 when full thickness is achieved. The pods 21 are slightly larger than and may be congruent with the magnets 20 inserted and encased therein. For the embodiment described herein, the pods 21 may be square with sides of 18 mm to 20 mm, particularly 19 mm and have a thickness, with the magnets 20 therein, of 7 mm to 9 mm, particularly 8 mm. The magnets 20 may likewise be square with sides of 1.4 cm to 2.4 cm particularly 1.9 cm and a thickness of 0.55 mm 0.75 mm, particularly 0.65 mm.

The bottom of the cover 10 may have four magnets 20 sized as described herein and juxtaposed with the periphery, providing magnetic connection of the cover 10 to the magnetic frame 42 around the flush port panel 41 substantially throughout the length of the bottom margin. The two isosceles sides 17 of the cover 10 may have two magnets 20 as described herein. The top side likewise has two magnets 20 as described here, with one such magnet 20 proximate the vertex of each isosceles side 17. A side of the perimeter 16, whether rectilinear as shown or curvilinear, which has at least one magnet 20 juxtaposed therewith for attachment to the frame 42 is herein referred to as an active side 18. A side of the perimeter 16, whether rectilinear as shown or curvilinear, which does not have at least one magnet 20 juxtaposed therewith is herein referred to as a passive side 18. The invention preferably does not have a magnet 20 at the interior of the shield 22.

This geometry provides the benefit that the cover 10 is symmetric about the vertical centerline and the same cover 10 can advantageously fit either the left or right data ports 40, even through they are of different [mirror image] shapes. One of skill will understand that instead of plural magnets 20 having a relatively shorter width taken parallel to the perimeter 16, fewer wider magnets 20 or a single magnet 20 may be used instead, providing adequate removable attachment at the side of the perimeter 16.

Figure 3:
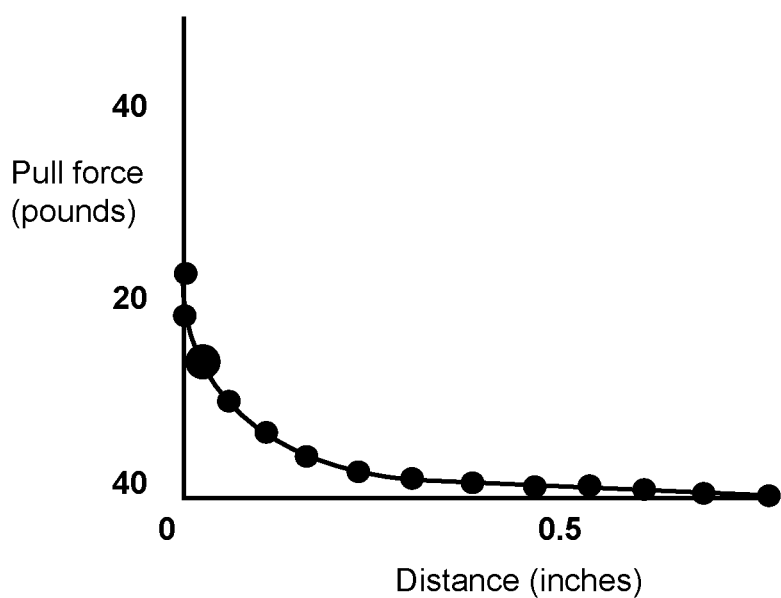
FIG. 3 is a graphical representation of the attenuation of the magnetic attraction as a function of attenuation of a magnet through the pod.

Referring to FIG. 3, each magnet 20 may have a removal force from the frame 42 of 5 kg to 7 kg, particularly 6 kg with attenuation through the pod 21. Ten magnets 20, each having a pull force of 8 kg to 12 kg, particularly 10 kg has been found suitable. A nickel coated NdFeB grade 42 magnet 20 has been found suitable for embodiment specifically described herein. It is understood that one isosceles side 17 of the cover 10 is not magnetically adhered to the skin of the aircraft.

Figure 4:
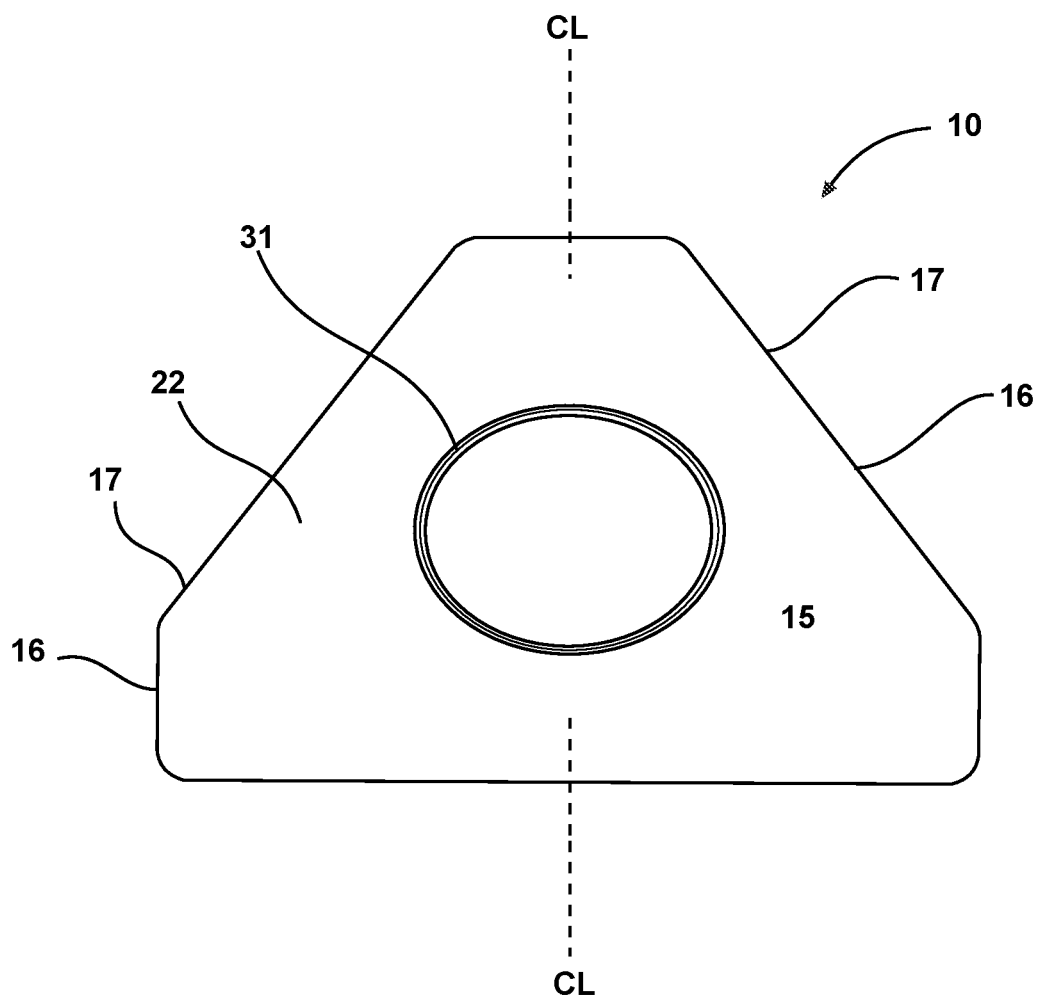
FIG. 4 is a back elevational view of the air data port of FIG. 1.

Referring to FIG. 4, the O-ring 31 is preferably within the central projection 30 extending outwardly from the front side 14 of the cover 10. The projection 30 is preferably congruent with and larger than the O-ring 31. The O-ring 31 and complementary projection 30 are preferably offset aft of the vertical centerline, so that the data port 40 can be fully intercepted and circumscribed by the O-ring 31 while the forward side of the cover 10 is not magnetically attached. The cover 10 has a corresponding grove on the back side 15 to receive an O-ring 31 therein. The oval O-ring 31 has a major axis and a minor axis perpendicular thereto intersecting at a center of the oval. The center of the oval is offset from the vertical centerline CL in the aft direction to accommodate the spacing from the forward edge of the frame 42. The groove may have a major axis of 96 mm, a minor axis of 73 mm, a circumference of 8.9 cm and a depth 5.9 mm to receive the complementary O-ring 31 therein. The O-ring 31 may extend outwardly from the back side 15 of the cover 10 a distance of 0.6 mm.

The flexible cover 10 may be bent convex towards the back side 15 and concave towards the front side 14 to open the groove for insertion and removal of the O-ring 31. The O-ring 31 is held in place by friction, although RTV silicone may be used for additional securement within the groove. Preferably the O-ring 31 is removable from the groove as part of ordinary maintenance. This O-ring 31 shape specifically corresponds to and is matched to the shape of the of the hole within the data port 40 of the F-35 aircraft. Outward of the central projection 30 is the rest of the cover 10, which provides for attachment to the skin on either side of the F-35 aircraft.

The shield 22 of the cover 10 may be made of a material suitable for 3D printing or casting which is resistant to oils and chemicals encountered during routine maintenance, is tear resistant, is elastic to return to a flat shape after being placed on the arcuate surface of the F-35 airframe and flexible in both cold weather and hot weather environments. By flexible and elastic it is meant that the cover 10 can be flexed during ordinary use by a maintainer to install and remove O-ring 31 as needed, can conform to the shape of the frame 42 circumscribing the air data port 40 and be macroscopically flat upon removal and resist damage from ordinary handling during use. The shield 22 may be made of thermoplastic polyurethane [TPU]. Particularly a low friction, medium durometer, high stretch TPU may be used. More particularly, TPU 95A may be advantageously used because it has an elastic stretch of almost 600% before breaking and is available in a variety of colors. A bright red or other bright color contrasting with the skin of the F-35 aircraft may be used so that the cover 10 is conspicuous and less likely to be inadvertently left in place during operation.

Figures 5, 6:
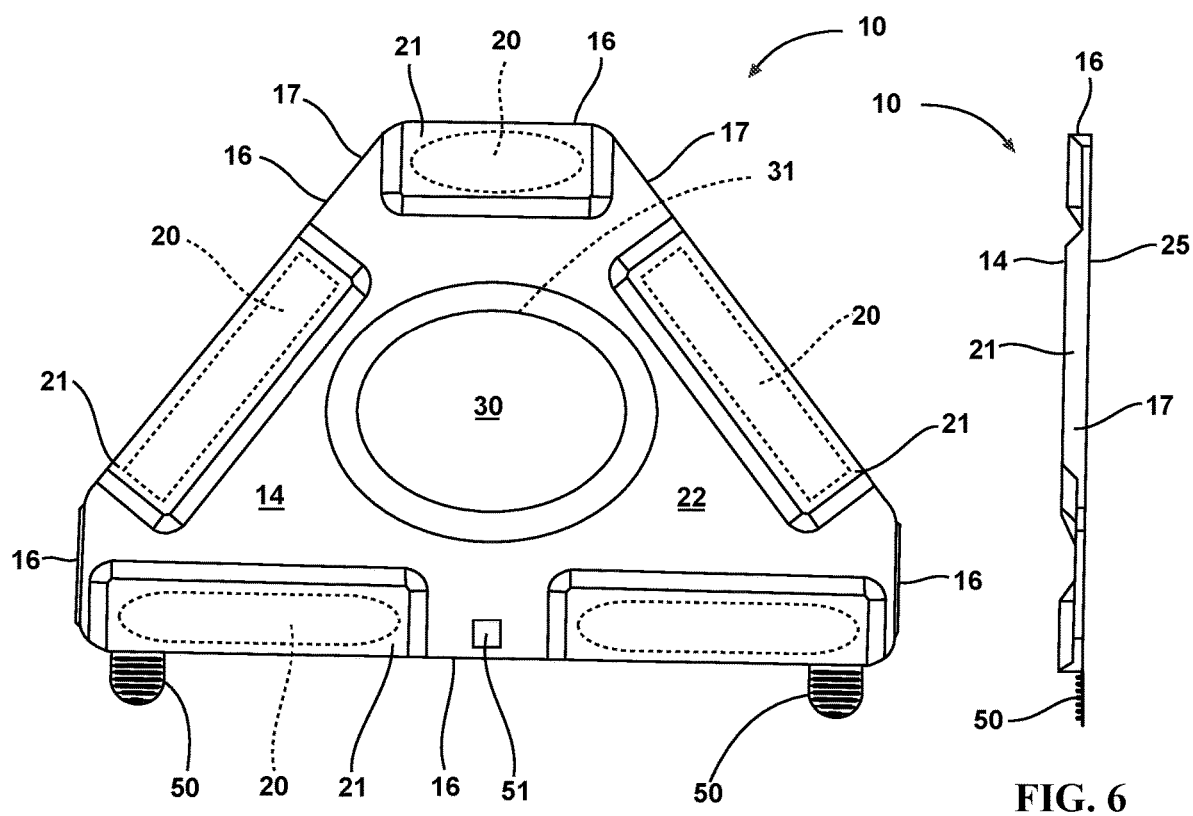
FIG. 5 is a front elevational view of an alternative embodiment of an air data port cover according to the present invention having an optional loop and tabs with elongate magnets shown in phantom.
FIG. 6 is a side elevational view of the air data port cover according of FIG. 6.

Referring to FIG. 5 and FIG. 6, optionally, the data port cover 10 may have one or more tabs 50 to assist in removal of the cover 10 from the F-35 aircraft. The tabs 50 may extend outwardly from the perimeter 16 of the cover 10 and be disposed on one or more sides thereof. Likewise, an optional open or closed loop 51 may be used. The loop 51 may be used to attach a flag or other indicia to the cover 10. The flag or other indicia is useful to alert personnel the covers 10 are in place and to be removed before flight operations. The tabs 50 and loop 51 may be formed during the 3D printing/additive manufacturing process or attached to the cover 10 afterwards. Optionally, the tabs 50 may extend outwardly from the skin of the F-35 aircraft when the data port cover 10 is attached thereto for ergonomic reasons.

The magnets 20 may be elongate as shown. This geometry provides more peripheral attachment of the cover 10 to the frame 42. However, the elongate magnets 20 increase the weight of the cover 10. One of skill may find the desired balance between greater magnetic attraction and weight of the cover 10.

Figure 7:
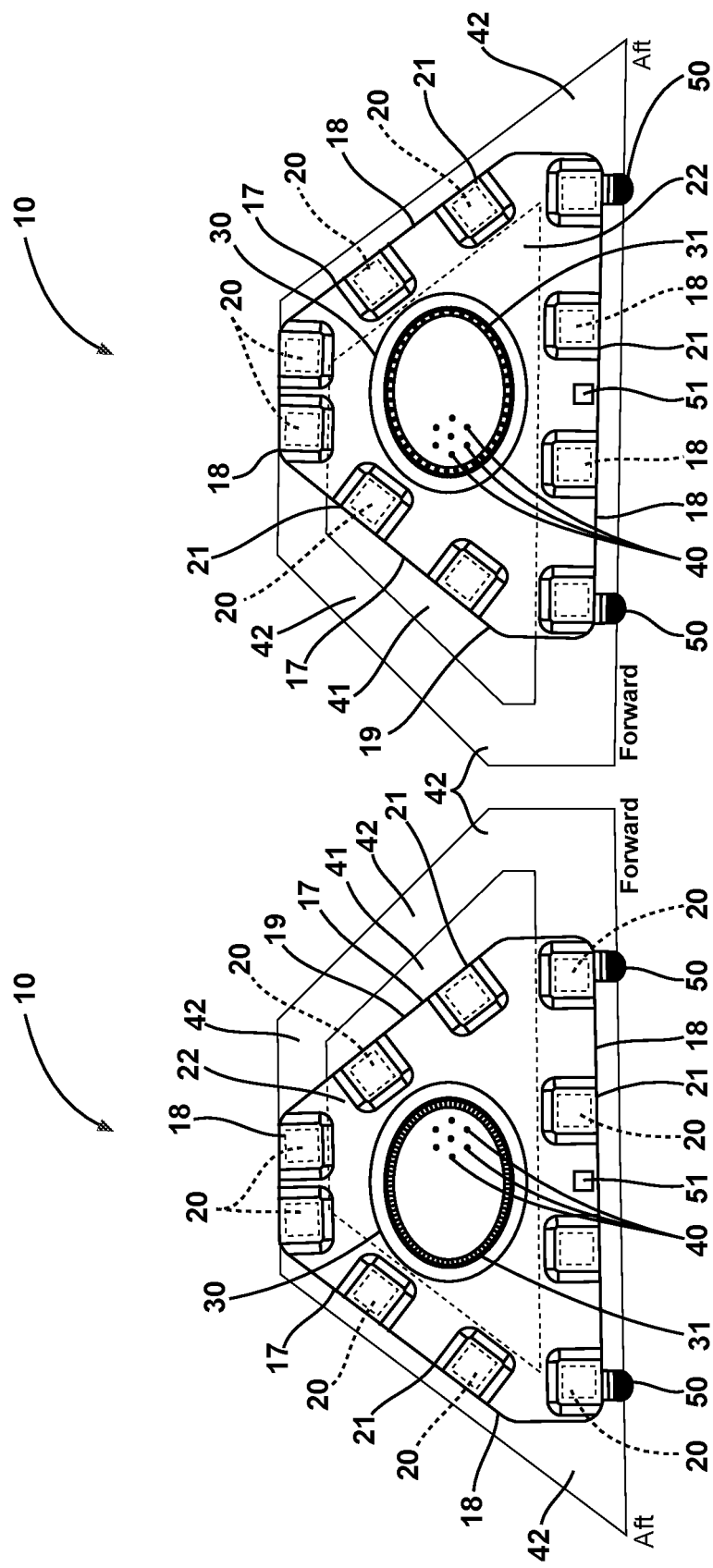
FIG. 7 is a front elevational view of a pair of identical air data port covers according to the present invention in fragmentary positions on opposite sides of a F-35 aircraft.

Referring to FIG. 7, in use when the same data port cover 10 is removably attached to either side of the F-35 aircraft, the forward isosceles side 17 is not attached to the magnetic frame 42 circumjacent the flush port panel 41 which, in turn, is circumjacent the data port 40. The aft side of the cover 10 is substantially attached through its length, as are the bottom and top sides. The cover 10 does not extend beyond or outward of the frame 42, to avoid damage to the delicate low observable coating. This arrangement provides sufficient attraction to removably hold the O-ring 31 in place, preventing intrusion of foreign substances and protecting the instrumentation therein. It can be seen that the air data ports 40 are arranged in a hexagon of six ports 40 plus a center port 40, for a total of seven air data ports 40. All seven of the air data ports 40 are safely within the O-ring 31, allowing for slight mispositioning of the cover 10 should the cover 10 not be installed in exact position.

Figure 8:
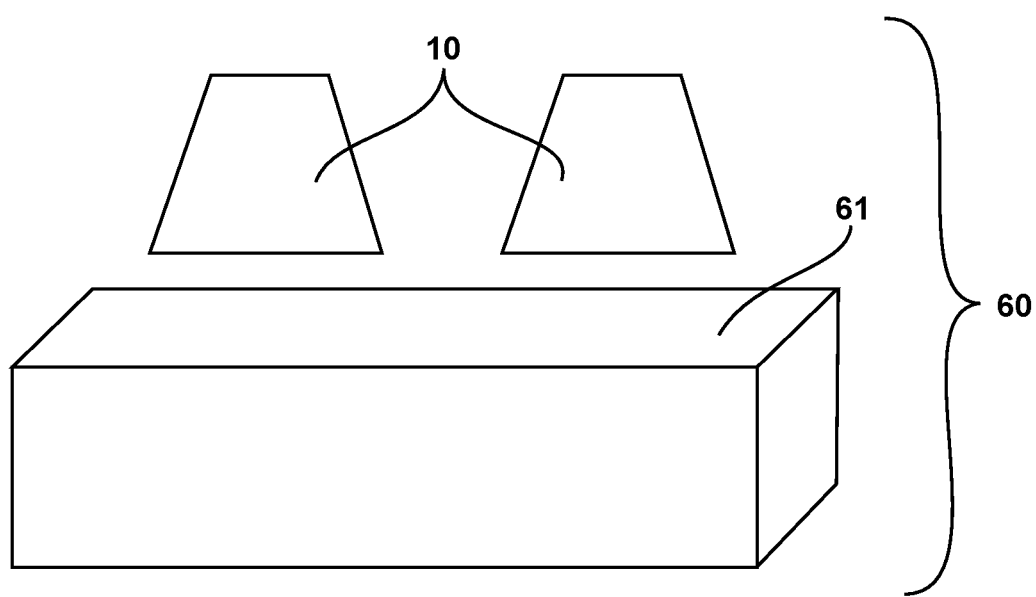
FIG. 8 is a schematic frontal view of a kit according to the present invention.

Referring to FIG. 8, a benefit to the air data port covers 10 of the present invention is that a pair of generally flat macroscopically planar mutually identical covers 10 may be provided as a kit 60, with an optional case 61 for storage. This kit 60 provides the benefit of flexibility not available with the prior art covers 10 that the generally flat macroscopically planar covers 10 of the present invention are sufficiently compact to be to be flown with any F-35 aircraft to a new location and deployed at that location. Such flexibility allows the F-35 aircraft to be stationed on the ground at locations which do not routinely tock the prior art air data port covers 10. The kit 60 is faster and easier to install and remove than the covers 10 of the prior art, advantageously reducing training time and prophetically reducing maintenance errors. Furthermore and unexpectedly, the air data port covers 10 of the present invention cost less than 10% of the air data port covers of the prior art.

All values disclosed herein are not strictly limited to the exact numerical values recited. Unless otherwise specified, each such dimension is intended to mean both the recited value and a functionally equivalent range surrounding that value. For example, a dimension disclosed as "40 mm" is intended to mean "about 40 mm." Every document cited herein, including any cross referenced or related patent or application, is hereby incorporated herein by reference in its entirety unless expressly excluded or otherwise limited. The citation of any document or commercially available component is not an admission that such document or component is prior art with respect to any invention disclosed or claimed herein or that alone, or in any combination with any other document or component, teaches, suggests or discloses any such invention. Further, to the extent that any meaning or definition of a term in this document conflicts with any meaning or definition of the same term in a document incorporated by reference, the meaning or definition assigned to that term in this document shall govern. All limits shown herein as defining a range may be used with any other limit defining a range of that same parameter. That is the upper limit of one range may be used with the lower limit of another range, and vice versa. As used herein, when two components are joined or connected the components may be interchangeably contiguously joined together or connected with an intervening element therebetween. While particular embodiments of the present invention have been illustrated and described, it would be obvious to those skilled in the art that various other changes and modifications can be made without departing from the spirit and scope of the invention and that various embodiments described herein may be used in any combination or combinations. It is therefore intended the appended claims cover all such changes and modifications that are within the scope of this invention.

What is claimed is:

1. An air data port cover in combination with an F-35 aircraft and being removably attached thereto, the combination comprising:
   a first air data port disposed in a side of the F-35 aircraft and being circumscribed by a five-sided magnetic frame; and
   a one-piece air data port cover having a shield and a plurality of magnets permanently joined thereto, the air data port cover being macroscopically planar with an outwardly facing front side and a back side opposed thereto and having plural sides overlapping the frame and at least one side spanning and within the frame wherein the at least one side is not magnetically attached to the frame and the air data port cover is removably magnetically attached to the F-35 aircraft to thereby cover the first air data port, wherein the air data port cover is symmetric about a vertical centerline, and is frusto triangular shaped, having six sides, with four sides having respective magnets perimetrically juxtaposed therewith and two sides being free of magnets.

2. A combination according to claim 1 wherein the air data port magnetically attached to the F-35 aircraft is a first the air data port cover on a first side thereof and further comprising a second air data port cover identical to the first air data port cover and being removably magnetically attached to the F-35 aircraft to thereby cover a second air data port.

3. A combination according to claim 1 wherein the two sides of the frustro triangular shaped air data port cover being free of magnets are symmetrically oppositely disposed about the vertical centerline.

4. A combination according to claim 3 wherein the air data port further comprises an O-ring embedded in the back side thereof and configured to fit the perimeter of the air data port and wherein the shield is monolithic and polymeric.

5. A kit for temporarily covering two air data ports disposed on opposite sides of a F-35 aircraft, the kit comprising:
   a pair of mutually identical, one-piece, macroscopically planar flexible air data port covers wherein either air data port cover of the pair is configured to be removably magnetically attached to a magnetic frame circumscribing either of the two air data ports of the F-35 aircraft,
   wherein each data port cover has an isosceles frustro triangular shape and is symmetric about a vertical centerline,
   and wherein each air data port cover has a front side and a back side opposed thereto, the front side having a central projection extending outwardly therefrom and defining a first oval, the backside having an O-ring embedded therein defining a second oval, the first oval and the second oval being mutually congruent, wherein the O-ring has a major axis and a minor axis perpendicular thereto defining a center and whereupon attachment to a frame of a F-35 aircraft the air data port thereof is offset from the vertical centerline of the respective cover in a forward direction so that the O-ring circumscribes the respective air data port.

6. A kit according to claim 5 wherein each data port cover has a perimeter with four active sides, each active side having at least one magnet juxtaposed therewith and configured to removably attach that respective active side to a complementary magnetic side of a frame circumscribing a respective air data port.

7. A kit according to claim 6 wherein each active side has a plurality of spaced apart magnets embedded in a respective pod, each respective pod intercepting the perimeter of the data port cover.

8. A kit according to claim 6 wherein each pod is part of a monolithic shield and extends outwardly from the front side of the air data port cover.

* * * * *